United States Patent [19]

Hung

[11] Patent Number: 4,596,425
[45] Date of Patent: Jun. 24, 1986

[54] PLASTIC WHEEL COVER USING RETAINING RING

[76] Inventor: Rong-Tsan Hung, 87-2, Pei-Tai Wan, Yun-Kang District, Tainan Hsien, Taiwan

[21] Appl. No.: 603,495

[22] Filed: Apr. 24, 1984

[51] Int. Cl.$^4$ ................................................ B60B 7/04
[52] U.S. Cl. ................................ 301/37 P; 301/37 CD
[58] Field of Search ................ 301/37 P, 37 T, 37 C, 301/37 CD, 108 R, 108 A

[56] References Cited

U.S. PATENT DOCUMENTS

| | | | |
|---|---|---|---|
| 2,963,319 | 12/1960 | Barnes | 301/37 CD |
| 3,532,386 | 10/1970 | Marshall | 301/37 P |
| 3,747,984 | 7/1973 | Andrews et al. | 301/37 P |
| 4,007,967 | 2/1977 | Buerger | 301/37 P |
| 4,295,685 | 10/1981 | Spisak | 301/108 A X |
| 4,441,762 | 4/1984 | Segal | 301/37 P X |

Primary Examiner—David A. Scherbel
Attorney, Agent, or Firm—Knobbe, Martens, Olson & Bear

[57] ABSTRACT

An improved wheel, cover includes a cover body having a base circular support integrally formed along the circumferential surface adjacent to the edge portion on the inverse side, a plurality of lock openings separately provided on the outer wall of the base circular support, a notch and an aperture respectively provided in the cover body, a plurality of lock devices detachably secured in the lock openings, and a circular retaining ring coupled with the lock devices for ensuring the supporting stability of the lock devices, so that package size is practically reduced, material is saved, and connection and disconnection operations are simplified accordingly.

5 Claims, 6 Drawing Figures

ND RING

BACKGROUND OF THE INVENTION

This invention relates to an improved wheel cover which is designed for reducing the package size and facilitating the connecting and disconnecting operations without incurring material waste.

Conventionally, wheel covers are usually made in a structure as shown in FIG. 1, which structure includes: a cover body 8 with a base circular support 81 along the edge portion; a retaining ring 82 formed in the inner circumferential surface of the base circular support 81; a plurality of lock members 83, each of which has a lock groove 831 with a lock piece 9 fixedly secured therein, separately provided on the outer wall of the base circular support 81; a tire-valve notch 821 formed in the retaining ring 82; and an aperture 821' corresponding to the notch 821 provided in the cover body 8. When connecting the cover body 8 to the wheel rim, the notch 821 and the aperture 821' are aligned with the tire valve, and the cover body 8 is forcefully pressed inward so as to push all the lock pieces 9 to be engaged with the inner edge of the rim flange, and the cover body 8 is secured on the wheel rim accordingly. However, problems suffered by this structure of the known wheel cover are as follows:

(1) As the structure of the known hubcaps is bulky, the package requires more transportation costs;

(2) Because the connection and disconnection of the known wheel covers with the wheel have to be done by applying a heavy pressure against the lock pieces 9, which are usually made of metal material, the lock pieces 9 are easily deformed or damaged, and the relevant surfaces of the wheel rim are also affected with scratches. Therefore, the locking stability of the wheel cover on the wheel rim is not secure and even coming loose therefrom;

(3) Once the lock pieces 9 are damaged, the entire wheel cover has to be replaced with a new one;

(4) Operations of connection and disconnection of the wheel cover with the wheel rim are inconvenient and also laborious. Since all the lock pieces 9 are fixed in the lock members 83, during disconnection operation, a steel stick, such as a screwdriver, has to be inserted into the notch 821 and the aperture 821' for prying it apart with great effort; and (5) As all the lock pieces 9 are made of metal material and formed without sufficient resilience, if any one of the lock pieces 9 is deformed or damaged thereat, the different intensity of the lock pieces 9 will cause unbalanced condition in the wheel cover center so that the wheel cover may eventually come off therefrom and result in a serious situation.

SUMMARY OF THE INVENTION

It is therefore a primary object of this invention to provide an improved wheel cover that overcomes the foregoing problems associated with the prior art.

According to the present invention, this and other objects are achieved by providing an improved wheel cover structure, which comprises: a cover body having a base circular support integrally formed along the circumferential surface adjacent to the edge thereof; a plurality of lock openings provided on the outer wall of the circular support; a notch matched with an aperture formed in the cover body; a plurality of lock devices detachably installed in the lock openings of the base circular support; and a circular retaining member coupled with the lock devices; so that, package size is reduced, and connecting and disconnecting operations are simplified with great convenience.

Other advantages and features of the present invention will become clear from the following detailed description, which taken in conjunction with the annexed drawings, discloses a preferred embodiment of the present invention.

DETAILED DESCRIPTION OF THE PREFERRED EMBODIMENT

Figure 1:
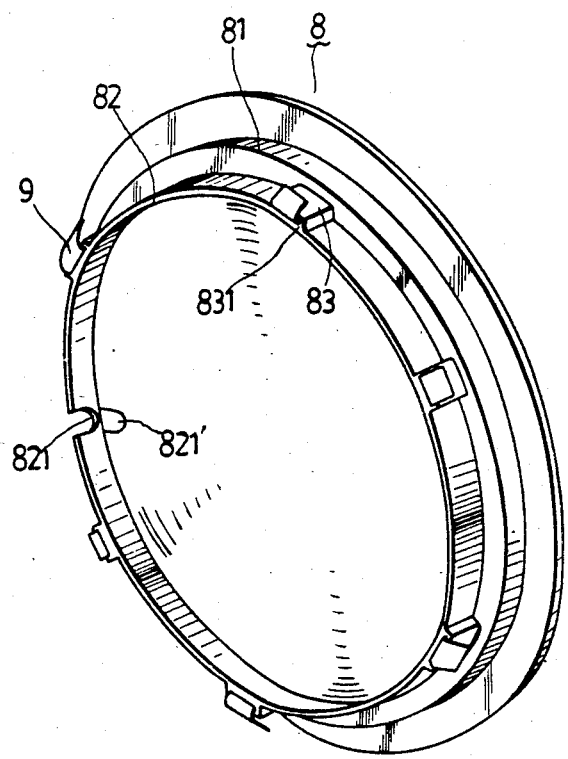
FIG. 1 is a structural illustration of the known wheel cover.
Figure 2:
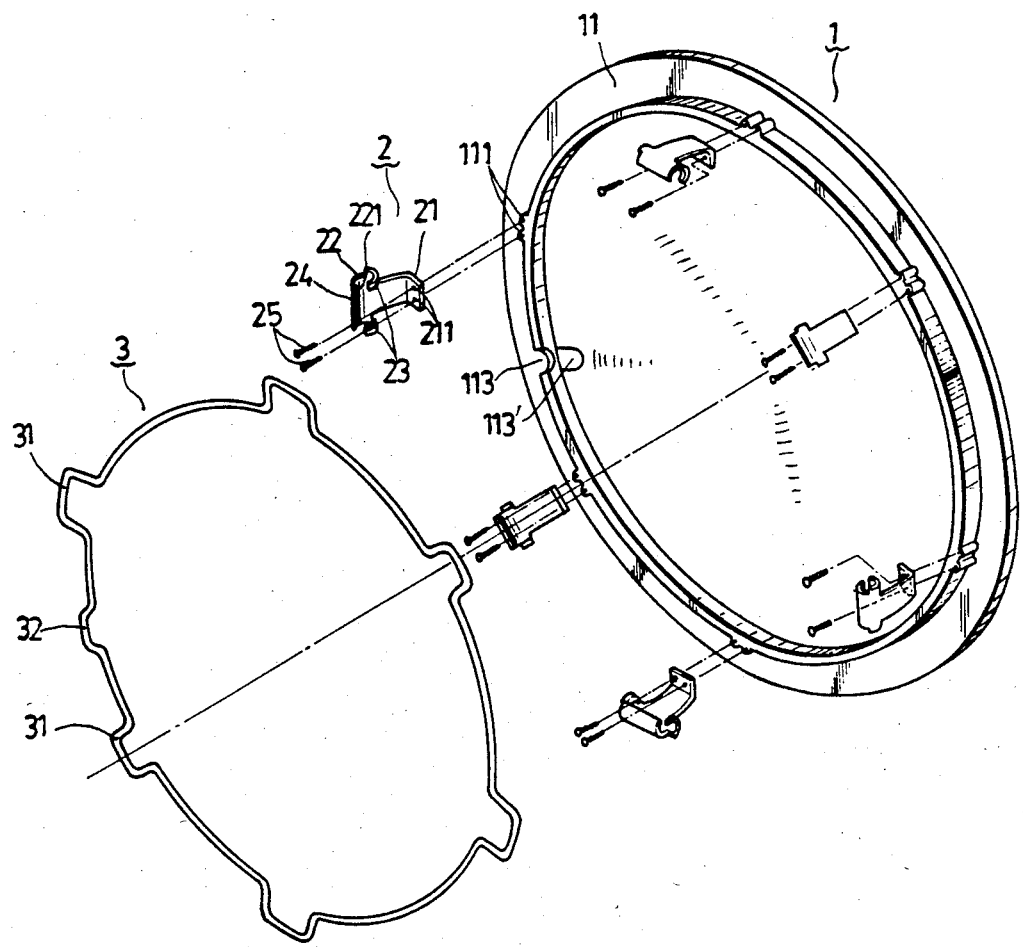
FIG. 2 is an exploded view of a preferred embodiment of an improved wheel cover according to this invention.

Referring to FIG. 2, there is shown a preferred embodiment of an improved wheel cover according to this invention, which cover comprises: a cover body 1 having a base circular support 11 integrally formed on the inner circumferential surface thereof; a plurality of lock openings 111 provided in pairs along the outer surface of the base circular support 11; a tire-valve notch 113 formed in the edge of the circular support 11; an aperture 113' corresponding to the notch 113 provided in the hubcap body 1; a plurality of lock devices 2 respectively secured in the paired lock openings 111; and a circular retaining member 3 engaged with the lock devices 2, which can be made of plastic material (such as ABS).

Each of the lock devices 2 includes: a connecting bend 21 at the lower end with a pair of screw holes 211 formed therein corresponding to the lock openings 111 of the base circular support 11; a lock support 22 with a double hook 23 and a curling side 24 formed at the upper end, defining a horizontal groove 221 therein.

The circular retaining member 3 includes a plurality of protuberances 31 spacingly formed along the circumferential edge in conjunction with grooves 221 of the lock devices 2, and an arcuate guide edge 32 formed at the edge thereof for matching with the locations of the tirevalve notch 113 and the aperture 113' of the cover body 1 in order to enable the tire valve to extend outward therefrom when the circular retaining member 3 is fit into and secured in the grooves 221 of the lock devices 2.

Figure 3:
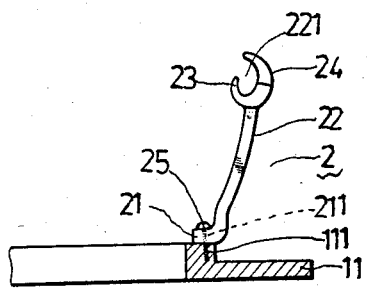
FIG. 3 is a sectional view of a lock device of the preferred embodiment shown in FIG. 2.

For the convenience of packing and transportation, the cover body 1, the lock devices 2 and the circular retaining member 3 are not assembled but packed together as a single unit so that package size is minimized and transportation cost reduced. In assembly operation, the lock devices 2 can be easily installed in the base circular support 11 of the cover body 1. As shown in FIG. 3, each of the connecting bends 21 of the lock devices 2 is respectively fixed in the lock openings 111 through the screw holes 211 with a plurality of screws 25 as shown in the drawing, and the circular retaining member 3 is installed in the lock devices 2 by respectively engaging the protuberances 31 in the grooves 221. The assembled cover body 1 is then connected to the wheel rim (not shown) by aligning the curling sides 24 with the hub edge and being pressed for making the engagement therewith. Since the lock support 22 of the lock devices 2 is resilient, the connection is easy and the coupling condition between the wheel rim and the cover body 1 is tightly secured therewith.

In disconnection operation, just insert a hard stick such as a screwdriver into the cover body 1 from any place along the edge of the cover body 1, and pull it apart from the wheel hub without incurring any scratch on the relevant surfaces of the wheel rim. Besides, if any one of the lock devices 2 is damaged, replacement can be made at any time without changing the cover body 1 and the circular retaining member 3 at the same time. Therefore, cost is greatly reduced.

Figure 4:
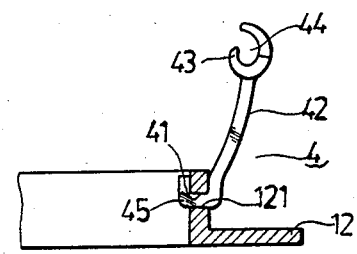
FIG. 4 is a sectional view of a modified example of the lock device according to this invention.

Referring to FIG. 4, there is shown a modified example of the lock devices 4 whose lock support 42, the double hook 43 and the curling side 44 are all identical with that of the lock devices 2 of the preferred embodiment shown in FIGS. 2 and 3 except that a U-shaped hook portion 45 formed at the lower end, defining a U-shaped groove 41 therein for being engaged in a lock opening 121 integrally provided in the base circular 12. The width of the U-shaped groove 41 is preferably a little smaller than the wall thickness of the base circular support 12. During assembly operation, first, the U-shaped groove 41 is engaged with the wall of the lock opening 121 of the base circular support 12 from outside, and then the lock support 42 is pushed upward for being secured in position as shown in FIG. 4.

Figure 5:
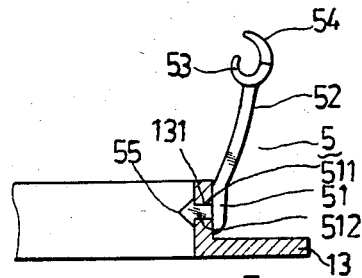
FIG. 5 is a sectional view of another modified example of the lock device according to this invention.

Referring to FIG. 5, there is shown another modified example of the lock devices 5 whose lock support 52, the curling side 54 and the double hook 53 are also identical with that of the lock devices 2 shown in FIG. 3 except that a flat plate 51 having a conical lock joint 55 at one side integrally formed at the lower end with an upper notch 511 and a lower notch 512 defined therebetween. A plurality of lock openings 131 corresponding to the conical lock joints 55 of the lock devices 5 provided in the base circular support 13 which is identical with the base circular support 11. In assembly operation, the conical lock joint 55 of each lock device 5 is forcefully pressed into the opening 131 and secured in position as shown in FIG. 5. The remaining connecting and disconnecting operations of the cover body 1 are all the same as that described hereinbefore for the preferred embodiment shown in FIG.'S 2 and 3.

Figure 6:
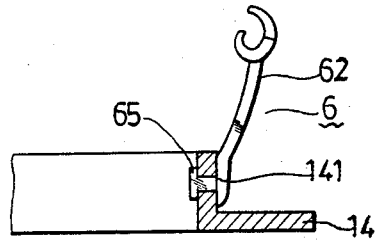
FIG. 6 is a sectional view of still another modified example of the lock device according to this invention.

Referring to FIG. 6, there is shown a further modified example of the lock devices 6. As can be seen in the drawing, the structure of the lock devices 6 is almost the same as that of the lock devices 5 shown in FIG. 5 except that an I-shaped lock joint 65 is formed at the lower end of each of the lock devices 6. In assembly operation, the lock support 62 is held in horizontal position for inserting the lock joint 65 into the lock opening 141 of the base circular support 14, and then, the lock support 62 is pushed upward until the lock joint 65 is secured therein as shown in FIG. 6.

While a preferred embodiment has been chosen to illustrate the invention, it will be understood by those skilled in the art that various changes and modifications can be made therein without departing from the scope of the invention as defined in the appending claims.

What is claimed is:

1. An improved wheel cover having a cover body with a base circular support integrally formed along the circumferential surface adjacent to the edge thereof, a plurality of locating fixtures separately provided in the outer wall of the base circular support, and a tire-valve notch together with an aperture formed therein, comprising:
    a plurality of lock means respectively, removably secured in said locating fixtures for connecting the cover to the wheel to interconnect and hold the lock means in the desired position relative to each other; and
    a retaining means removably coupled to said lock means, each of said lock means comprising:
        a lock support plate made of plastic material, a connecting bend having fixing means provided at a lower end of said lock support plate for being secured in the locating fixtures, a curling side integrally formed at an upper end of said lock support plate, and a double hook integrally provided at the opposing side of said lock support plate located opposite to said curling side with a horizontal groove to find therein for receiving and engaging said retaining means
        whereby the wheel cover may be connected and disconnected to and from the wheel with readiness and ease.

2. An improved wheel cover having a cover body with a base circular support integrally formed along the circumferential surface adjacent to the edge thereof, a plurality of locating fixtures separately provided in the outer wall of the base circular support, and a tire-valve notch together with an aperture formed therein, comprising:
    a plurality of lock means respectively, removably secured in said locating fixtures for connecting the cover to the wheel to interconnect and hold the lock means in a desired position relative to each other; and a retaining means removably coupled to said lock means, said retaining means comprising:
    a circular ring having a plurality of protuberances spaced along the outer edge thereof and located in conjunction with said lock means secured in position so as to be engaged therewith, and arcuate guide edge formed thereat for matching with locations of the tire-valve notch and the aperture of the cover body,
    whereby the wheel cover may be connected and disconnected to and from the wheel with readiness and ease.

3. An improved wheel cover having a cover body with a base circular support integrally formed along the circumferential surface adjacent to the edge thereof, a plurality of locating fixtures separately provided in the outer wall of the base circular support, and a tire-valve notch together with an aperture formed therein, comprising:
    a plurality of lock means respectively, removably secured in said locating fixtures for connecting the cover to the wheel to interconnect and hold the lock means in a desired position relative to each other; and
    a retaining means removably coupled to said lock means, each of said lock means comprising:
        a lock support plate made of plastic material, a U-shaped portion formed at a lower end of said lock support plate with a U-shaped groove defined thereto for being engaged in the locating fixtures of the base circular support, a curling side integrally formed at an upper end of said lock support plate, and a double hook integrally provided at the opposing sides of said lock support plate and located opposite to said curling side with a horizontal groove defined therein for being engaged with said retaining means, whereby the wheel cover may be connected and disconnected to and from the wheel with readiness and ease.

4. An improved wheel cover having a cover body with a base circular support integrally formed along the circumferential surface adjacent to the edge thereof, a plurality of locating fixtures separately provided in the outer wall of the base circular support, and a tire-valve notch together with an aperture formed therein, comprising:

a plurality of lock means respectively, removably secured in said locating fixtures for connecting the cover to the wheel to interconnect and hold the lock means in a desired position relative to each other; and a retaining means removably coupled to said lock means, each of said lock means comprising:

a lock support plate made of plastic material, a flat lock portion integrally formed at a lower end of said lock support plate, a conical lock joint integrally provided on one side of said flat lock portion with an upper notch and a lower notch correspondingly defined on the opposing sides of said conical lock joint for being secured in the locating fixtures of the base circular support, a curling side integrally formed at an upper end of said lock support plate, and a double hook portion integrally provided at the opposing sides of said lock support and located opposite to said curling side with a lock groove defined therein for being engaged with said retaining means, whereby the wheel cover may be connected and disconnected to and from the wheel with readiness and ease.

5. An improved wheel cover having a cover body with a base circular support integrally formed along the circumferential surface adjacent to the edge thereof, a plurality of locating fixtures separately provided in the outer wall of the base circular support, and tire-valve notch together with an aperture formed therein, comprising:

a plurality of lock means respectively, removably secured in said locating fixtures for connecting the cover to the wheel to interconnect and hold the lock means in a desired position relative to each other; and a retaining means removably coupled to said lock means, each of said lock means comprising:

a lock support plate made of plastic material, a flat lock portion integrally formed at a lower end of said lock support plate, and I-shaped lock joint integrally provided at one side of said flat lock portion for being secured in the locating fixtures of the base circular support, a curling side integrally formed at an upper end of said lock support plate, and a double hook portion integrally provided at the upper opposing sides of said lock support plate and located opposite to said curling side with a lock groove defined therein for being engaged with said retaining means, whereby the wheel cover may be connected and disconnected to and from the wheel with readiness and ease.

* * * * *